(12) United States Patent
Kuo et al.

(10) Patent No.: US 8,326,975 B2
(45) Date of Patent: Dec. 4, 2012

(54) POWER-SAVING NETWORK APPARATUS HAVING PHYSICAL LAYER CIRCUIT CAPABLE OF ENTERING LOW POWER STATE

(75) Inventors: Shieh-Hsing Kuo, Taipei County (TW); Ta-Chin Tseng, Taipei County (TW); Ming-Je Li, Yilan County (TW); Ting-Fa Yu, Yunlin County (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 540 days.

(21) Appl. No.: 12/354,786

(22) Filed: Jan. 16, 2009

(65) Prior Publication Data
US 2009/0193109 A1 Jul. 30, 2009

Related U.S. Application Data

(60) Provisional application No. 61/021,904, filed on Jan. 18, 2008.

(30) Foreign Application Priority Data

Jan. 16, 2009 (TW) ................ 98101499 A

(51) Int. Cl.
*G06F 15/16* (2006.01)
*G06F 1/26* (2006.01)
*G06F 1/32* (2006.01)

(52) U.S. Cl. ...................... 709/224; 713/320

(58) Field of Classification Search .................. 709/224; 713/320
See application file for complete search history.

(56) References Cited

U.S. PATENT DOCUMENTS

| 2004/0073933 A1* | 4/2004 | Gollnick et al. ................. 725/81 |
| 2005/0041727 A1* | 2/2005 | Agazi ............................. 375/219 |
| 2007/0269212 A1* | 11/2007 | Remein et al. ................... 398/63 |
| 2008/0225841 A1 | 9/2008 | Conway et al. | |

* cited by examiner

*Primary Examiner* — George C Neurauter
(74) *Attorney, Agent, or Firm* — Winston Hsu; Scott Margo

(57) ABSTRACT

A power-saving network apparatus includes a MAC and a PHY. The PHY includes a transmitter and a receiver. The transmitter executes the operations of: transmitting a data signal to a remote network apparatus according to output packets of the MAC when the transmitter enters a normal state; transmitting an idle signal to the remote network apparatus when the transmitter enters an idle state; transmitting an indication signal to the remote network apparatus to notify it to enter a low power state, wherein the indication signal is different from the idle signal; entering the idle state or the normal state from the low power state in response to at least one of a predetermined period and a transmitting enable signal.

30 Claims, 5 Drawing Sheets

POWER-SAVING NETWORK APPARATUS HAVING PHYSICAL LAYER CIRCUIT CAPABLE OF ENTERING LOW POWER STATE

CROSS REFERENCE TO RELATED APPLICATIONS

This application claims the benefit of U.S. Provisional Application No. 61/021,904, which was filed on Jan. 18, 2008 and is incorporated herein by reference. In addition, this application claims priority of Taiwanese Application No. 098101499, filed on Jan. 16, 2009 and is incorporated herein by reference.

BACKGROUND OF THE INVENTION

1. Field of the Invention

The present invention relates to a power-saving method applied to a network system and a related apparatus, and more particularly, to a method and a related apparatus capable of entering and leaving a low power state in the PHY layer to save power.

2. Description of the Prior Art

In a high-speed network system, such as 1 Gbase-T/10 Gbase-T Ethernet system, the power consumption of the network system increases correspondingly if its circuits operate frequently. Hence, how to save the power consumption of the network system becomes an important topic of the field.

At present, the method of work is using lower frequency to transmit link pulses when the physical layer of the network system is in the non-link state to achieve the goal of saving power. If the network system is in the link state, the power-saving mechanism focused on the physical layer can save power only by lowering speed or by lowering the transmitting capacity of the transmitter or the receiving capacity of the receiver. However, when the network system is in the link state, the power-saving effect of such mechanism is not good enough, due to all of the circuits of the transmitter and the receiver being still in power-on state.

The traditional network system must keep sending out a fixed idle pattern to maintain a connection when lying in the link state, even if there is no packet to be transmitted and it is in the idle state. In order to let the remote network device identify the idle pattern, this idle pattern must conform to Ethernet standard idle signal defined by IEEE standard. At this time, the power consumption of the network system is slightly lower than the power consumption in the normal state (i.e., transmitting the packets), which is actually not cost-effective. In addition, another method for saving power by changing the transmission characteristics of the idle pattern has already been disclosed in the prior art, which can be referred to U.S. Published Application No. 2008/0225841.

SUMMARY OF THE INVENTION

It is therefore one of the objectives of the claimed invention to provide a power-saving method applied to a network system and related apparatus for solving the abovementioned problems.

According to an exemplary embodiment of the present invention, a power-saving network apparatus for maintaining a connection with a remote network apparatus through a physical line in a normal state, an idle state, and a low power state is provided. The power-saving network apparatus includes a MAC and a PHY. The MAC generates output packets according to output digital signals and processing input packets of the remote network apparatus. The PHY is coupled to the MAC and to the remote network apparatus through the physical line. The PHY includes a transmitter and a receiver. The transmitter executes the operations of: transmitting a local data signal to the remote network apparatus according to the output packets of the MAC when the transmitter enters a normal state; transmitting a local idle signal to the remote network apparatus when the transmitter enters an idle state; transmitting a local indication signal to the remote network apparatus to notify the remote network apparatus to enter the low power state, wherein the local indication signal is different from the local idle signal; and entering the idle state or the normal state from the low power state in response to at least one of a first predetermined period and a transmitting enable signal. The receiver executes the operations of: transmitting the input packets to the MAC of the power-saving network apparatus according to a remote data signal of the remote network apparatus when the receiver lies in the normal state; receiving a remote idle signal of the remote network apparatus when the receiver lies in the idle state; entering the low power state when the receiver receives a remote indication signal of the remote network apparatus, wherein the remote indication signal is different from the remote idle signal to avoid the receiver treating the remote indication signal as the remote idle signal; and entering the idle state or the normal state from the low power state in response to at least one of a second predetermined period and a wake-up signal.

These and other objectives of the present invention will no doubt become obvious to those of ordinary skill in the art after reading the following detailed description of the preferred embodiment that is illustrated in the various figures and drawings.

DETAILED DESCRIPTION

The instant application contains a claim under §1.55 for priority of a prior-filed foreign application (Taiwanese Application No. 098101499, filed on Jan. 16, 2009) and a claim under §1.78 for the benefit of a prior-filed provisional application (U.S. Provisional Application No. 61/021,904, filed on Jan. 18, 2008). In accordance with 37 C.F.R 1.57, if all or a portion of the specification or drawing(s) is inadvertently omitted from the instant application, the inadvertently omitted portion of the specification or drawing(s) is completely contained in the prior-filed applications as the claim under §1.55 and the claim under §1.78 shall also be considered an incorporation by reference of the prior-filed applications as to the inadvertently omitted portion of the specification or drawing(s).

The following embodiments focus on a network system in a link state. If the network system is in the link state with no demands for transmitting/receiving packets, it can enter the low power state to turn off a part of or all power supplies of the transmitter and the receiver; and if the network system is in the link state with demands for transmitting/receiving packets, it can return to the normal state timely for transmitting/receiving the packets to achieve the best power-saving effect. Accordingly, through the power-saving network apparatus and mechanism disclosed in the present invention, both sides can be notified when to enter/leave the low power state. Such mechanism only needs signal processing in the PHY layer and has no need for additional processing in the MAC layer, so as to shorten the whole processing time. Furthermore, in the following embodiments, the terms "local" and "remote" are merely used for discriminating names, not as a function of limited use.

Figure 1:
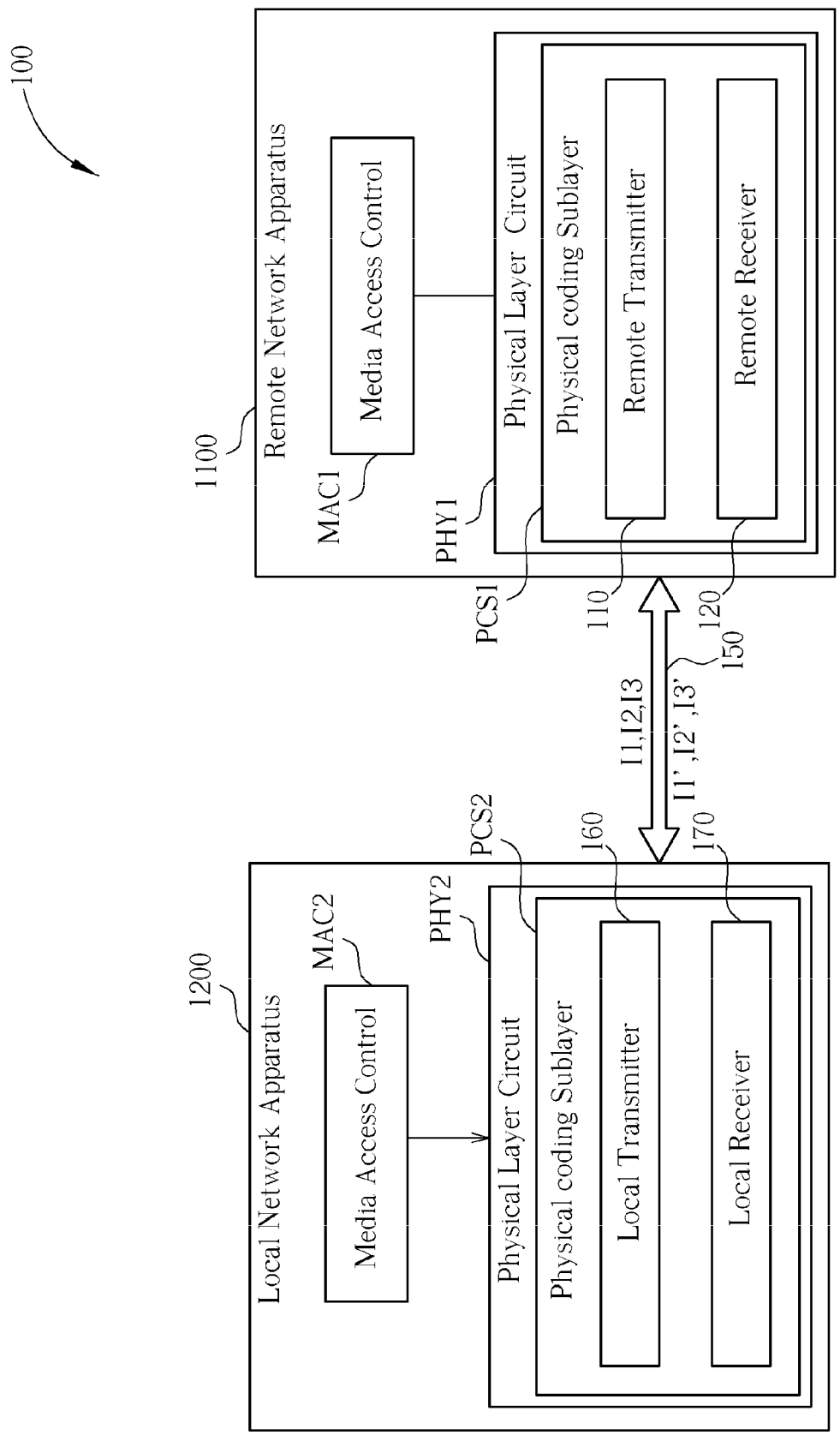
FIG. 1 is a diagram of a network system with power-saving mechanism according to a first embodiment of the present invention.

Please refer to FIG. 1. FIG. 1 is a diagram of a network system 100 with power-saving mechanism according to a first embodiment of the present invention. As shown in FIG. 1, the network system 100 includes, but is not limited to, a remote network apparatus 1100 and a local network apparatus 1200, wherein the local network apparatus 1200 maintains a connection with the remote network apparatus 1100 through a physical line 150. The remote network apparatus 1100 includes a media access controller MAC1 and a physical layer circuit PHY1. The media access controller MAC1 generates output packets and processing input packets of the remote network apparatus 1100. The physical layer circuit PHY1 includes a physical coding sublayer PCS1 for decoding and encoding the transmitted/received data. The physical coding sublayer PCS1 of the remote network apparatus 1100 has a remote transmitter 110 and a remote receiver 120. On the other hand, the local network apparatus 1200 also includes a media access controller MAC2 and a physical layer circuit PHY2, wherein the physical layer circuit PHY2 includes a physical coding sublayer PCS2 for decoding and encoding the transmitted/received data. The physical coding sublayer PCS2 of the local network apparatus 1200 has a local transmitter 160 and a local receiver 170. Details and operations of the remote network apparatus 1100 and the local network apparatus 1200 will be further illustrated in the following embodiments.

In this embodiment, two network apparatus 1100 and 1200 are adopted for illustration, but this should not be considered as limitations of the present invention. The number and the type of the network apparatuses are not limited, for example, the type can be a network interface circuit or a multi-ports network device, whereof the multi-ports network device can be a hub, a switch, a router, or a gateway.

When the local transmitter 160 enters the normal state S1, the local transmitter 160 transmits a local data signal I3 to the remote network apparatus 1100 according to the output packets of MAC2. When the local transmitter 160 enters the idle state S3, the local transmitter 160 transmits a local idle signal I2 to the remote network apparatus 1100. When the local transmitter 160 enters the low power state S2, the local transmitter 160 transmits a local indication signal I1 to the remote network apparatus 1100 to notify the remote network apparatus 1100 to enter the low power state S2, wherein the local indication signal I1 is different from the local idle signal I2 to avoid the remote network apparatus 1100 treating the local indication signal I1 as the local idle signal I2. In addition, due to the low power state S2 being only disclosed in the present invention, the remote network apparatus 1100 may not support the low power state S2 (for example, the remote network apparatus 1100 may not recognize the local indication signal I1). In order to prevent the local network apparatus 1200 from entering the low power state S2 to result in a link failure without considering a condition that the remote network apparatus 1100 may not support the low power state S2, the local network apparatus 1200 can verify whether the remote network apparatus 1100 agrees to enter the low power state S2 according to a response signal of the remote network apparatus 1100, wherein the response signal indicates whether the local receiver 170 received or not received the local indication signal I1 from the remote network apparatus 1100. In another embodiment of the present invention, the local network apparatus 1200 can also confirm whether the remote network apparatus 1100 supports the low power state S2 through switching communication protocols in the beginning of building the connection with the remote network apparatus 1100, and therefore the local network apparatus 1200 can directly enter the low power state S2 without waiting for the response signal for the local indication signal I1 from the remote network apparatus 1100. In addition, in this embodiment, the local transmitter 160 enters the idle state S3 or the normal state S1 from the low power state S2 in response to at least one of a first predetermined period (such as a fixed period) and a transmitting enable signal, wherein the transmitting enable signal is a signal provided by the MAC2 to the PHY2 when transmitting the packets.

On the other hand, when the local receiver 170 is in the normal state S1, the local receiver 170 transmits the input packets to the MAC2 of the local network apparatus 1200 according to a remote data signal I3' of the remote network apparatus 1100. When the local receiver 170 is in the idle state S3, the local receiver 170 receives a remote idle signal I2' of the remote network apparatus 1100. When the local receiver 170 receives a remote indication signal I1' of the remote network apparatus 1100, the local receiver 170 enters the low power state S2, wherein the remote indication signal I1' is different from the remote idle signal I2' to avoid the receiver 170 treating the remote indication signal I1' as the remote idle signal I2'. Moreover, the local receiver 170 enters the idle state S3 or the normal state S1 from the low power state S2 in response to at least one of a second predetermined period (such as a fixed period) and a wake-up signal, wherein the wake-up signal is generated by the remote network apparatus 1100.

Please note that, in this embodiment, the local idle signal S2 is the same as the remote idle signal I2', and the wake-up signal is the same as the local idle signal I2 and the remote idle signal I2'. The local idle signal I2, the remote idle signal I2', and the wake-up signal are Ethernet standard IDLE signals. In addition, the abovementioned local indication signal I1 is the same as the remote indication signal I1'. However, those skilled in the art should appreciate that as long as the meaning of each designed signal can be identified by the local network apparatus 1200 and the remote network apparatus 1100 and no matter what meaning each designated signal is (the same signal or different signals), they can also implement the present invention.

Please also note that, when the local transmitter 160 enters the low power state S2, the PHY2 turns off the power supply to part or all circuits of the local transmitter 160 to achieve a goal of saving power. When the local transmitter 160 enters the idle state S3 or the normal state S1, the PHY2 turns on the power supply to part or all circuits of the local transmitter 160. When the local receiver 170 enters the low power state S2, the PHY2 turns off the power supply to part or all circuits of the local receiver 170 to achieve a goal of saving power. When the local receiver 170 enters the idle state S3 or the normal state S1, the PHY2 turns on the power supply to part or all circuits of the local receiver 170. The power consumption of the local network apparatus 1200 in the low power state S2 is smaller than that in the idle state S3, and the power consumption of the local network apparatus 1200 in the idle state S3 is smaller than that in the normal state S1.

Figure 2:
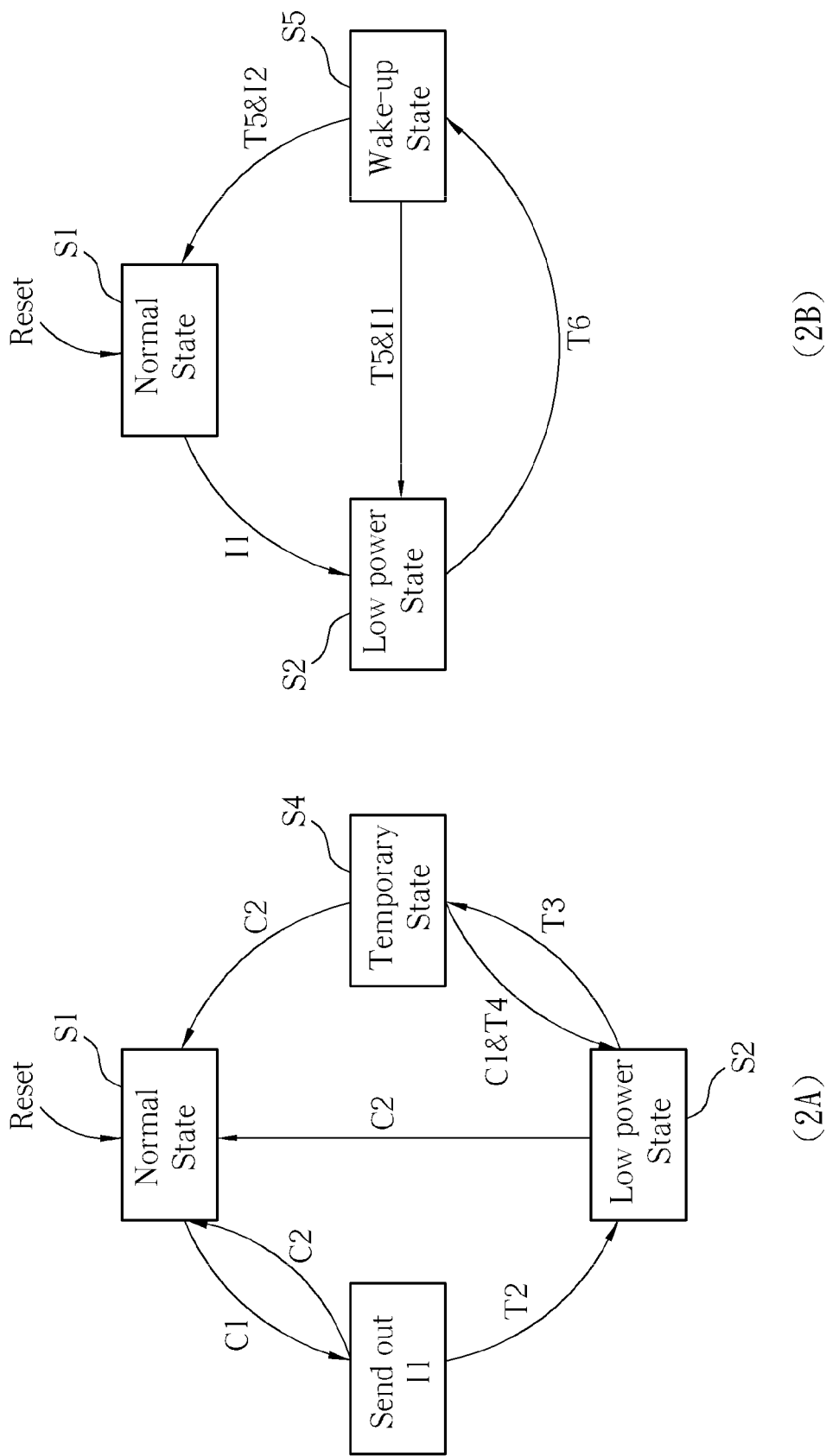
FIG. 2 (including 2A and 2B) is a diagram illustrating the states switched by the local transmitter of the local network apparatus and the remote receiver of the remote network apparatus shown in FIG. 1.

Please refer to FIG. 2. FIG. 2 (including 2A and 2B) is a diagram illustrating the states switched by the local transmitter 160 of the local network apparatus 1200 and the remote receiver 120 of the remote network apparatus 1100 shown in FIG. 1. 2A illustrates the condition that the local transmitter 160 of the local network apparatus 1200 switches states between the normal state and the low power state, and 2B illustrates the condition that the remote receiver 120 of the remote network apparatus 1100 switches states between the normal state and the low power state. As shown in 2A, after the local transmitter 160 sends out the local indication signal I1 through the physical line 150, a time T2 is needed to maintain the local transmitter 160 in the normal state S1, which gives the remote receiver 120 enough time for reserving equalizer parameters. The time T2 is approximately several µs, which includes a delay time T1 (approximately hundreds of ns). After the local transmitter 160 has entered the low power state S2, it can wake up every a fixed time T3, wherein this time T3 is about a few µs. And then the local transmitter 160 enters the temporary state S4 to update parameters, wherein the time T4 for updating parameters is about one second to several seconds. After that, if the local transmitter 160 receives the command of leaving the low power state S2, it returns to the normal state S1; otherwise, it continues returning to the low power state S2.

As shown in 2B, after the remote receiver 120 has received the local indication signal I1, the remote receiver 120 leaves the normal state S1 and enters the low power state S2. After the remote receiver 120 has entered the low power state S2, the local transmitter 160 must be masked within the duration of transmitting the local indication signal I1 to prevent from waking up soon, wherein this time T6 is approximately one µs to several µs. When signals are detected by the remote receiver 120, an operation for automatically retraining parameters is needed. At this time, the remote receiver 120 enters the wake-up state S5, wherein the time T5 is about a few µs. After that, if the remote receiver 120 receives the commands of leaving the low power state S2 (i.e., the local idle signal I2), it returns to the normal state S1; otherwise, it continues returning to the low power state S2. The values of the abovementioned time T1~T6 are merely for exemplification, and they can have different values based on different circuit designs and different applications.

Please note that the remote network apparatus 1100 and the local network apparatus 1200 are in a link state when they are in the abovementioned normal state S1 and the low power state S2. If the network system 100 is in the link state with no demands for transmitting/receiving packets, it can enter the low power state S2; and if the network system 100 is in the link state with demands for transmitting/receiving packets, it can return to the normal state S1 timely to transmit/receive the packets. Furthermore, the remote transmitter 110 and the remote receiver 120 can enter the low power state S2 simultaneously or only one of them is allowed to enter the low power state S2, and the difference between them is that the power consumptions they save are different. Similarly, the local transmitter 160 and the local receiver 170 can enter the low power state S2 simultaneously or only one of them is allowed to enter the low power state S2, which also belongs to the scope of the present invention.

These embodiments above are merely examples for describing the present invention, and in no way should be considered to be limitations of the present invention. It will be obvious to those skilled in the art that the remote network apparatus 1100 can be adopted as the local network device and the local network apparatus 1200 can be used as the remote link device for building a connection with the remote network apparatus 1100 in other embodiments. Due to the operations are the same, and further description is omitted here for brevity.

Figure 3:
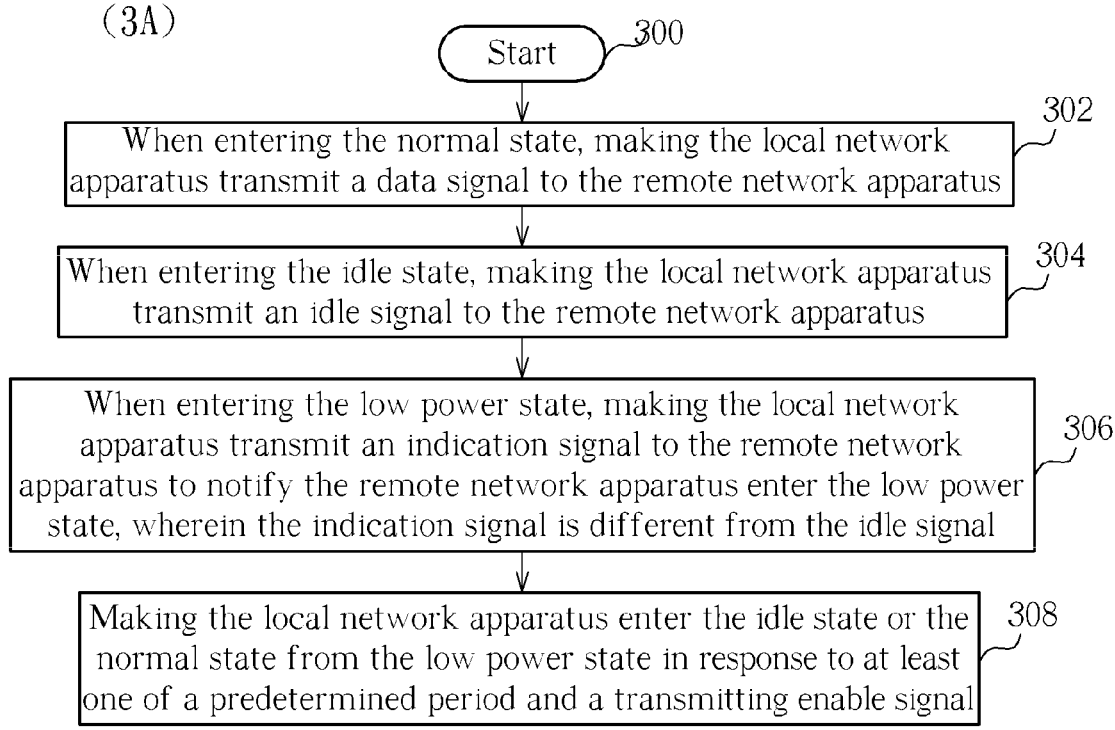
FIG. 3 (including 3A and 3B) is a flowchart illustrating a power-saving method applied to a network apparatus according to an exemplary embodiment of the present invention.
Figure 3:
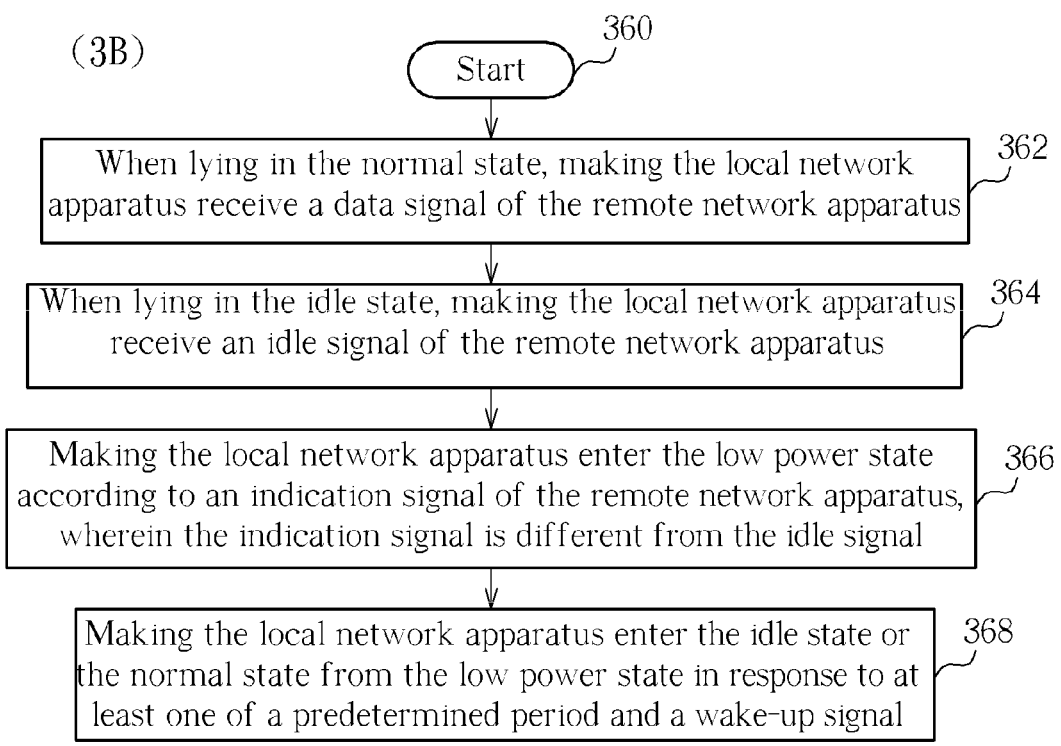

Please refer to FIG. 3. FIG. 3 (including 3A and 3B) is a flowchart illustrating a power-saving method applied to a network apparatus according to an exemplary embodiment of the present invention. Please note that the following steps are not limited to be performed according to the exact sequence shown in FIG. 3 if a roughly identical result can be obtained.

As shown in 3A, the method includes, but is not limited to, the following steps:

Step 300: Start.

Step 302: When entering the normal state, making the local network apparatus transmit a data signal to the remote network apparatus.

Step 304: When entering the idle state, making the local network apparatus transmit an idle signal to the remote network apparatus.

Step 306: When entering the low power state, making the local network apparatus transmit an indication signal to the remote network apparatus to notify the remote network apparatus enter the low power state, wherein the indication signal is different from the idle signal to avoid the remote network apparatus treating the indication signal as the idle signal.

Step 308: Making the local network apparatus enter the idle state or the normal state from the low power state in response to at least one of a predetermined period and a transmitting enable signal.

As shown in 3B, the method includes, but is not limited to, the following steps:

Step 360: Start.

Step 362: When lying in the normal state, making the local network apparatus receive a data signal of the remote network apparatus.

Step 364: When lying in the idle state, making the local network apparatus receive an idle signal of the remote network apparatus.

Step 366: Making the local network apparatus enter the low power state according to an indication signal of the remote network apparatus, wherein the indication signal is different from the idle signal to avoid the receiver treating the indication signal as the idle signal.

Step 368: Making the local network apparatus enter the idle state or the normal state from the low power state in response to at least one of a predetermined period and a wake-up signal.

How each element operates can be known by collocating the steps shown in FIG. 3 and the elements shown in FIG. 1. Further description of the operations of each step shown in 3A and 3B is therefore omitted here for brevity. The steps shown in 3A are executed by the local transmitter 160 of the local network apparatus 1200, and the steps shown in 3B are executed by the local receiver 170 of the local network apparatus 1200. Be noted that, the steps in 3A illustrates how the local transmitter 160 shown in FIG. 1 switches states from the normal state S1 to the low power state S2, and the steps in 3B illustrates how the local receiver 170 switches states from the low power state S2 to the normal state S1.

Of course, the abovementioned network system 100 is merely a practicable embodiment of the present invention. In other embodiments, more functions can be designed into the remote network apparatus 1100 and the local network apparatus 1200 to improve the application range of the network system 100.

Figure 4:
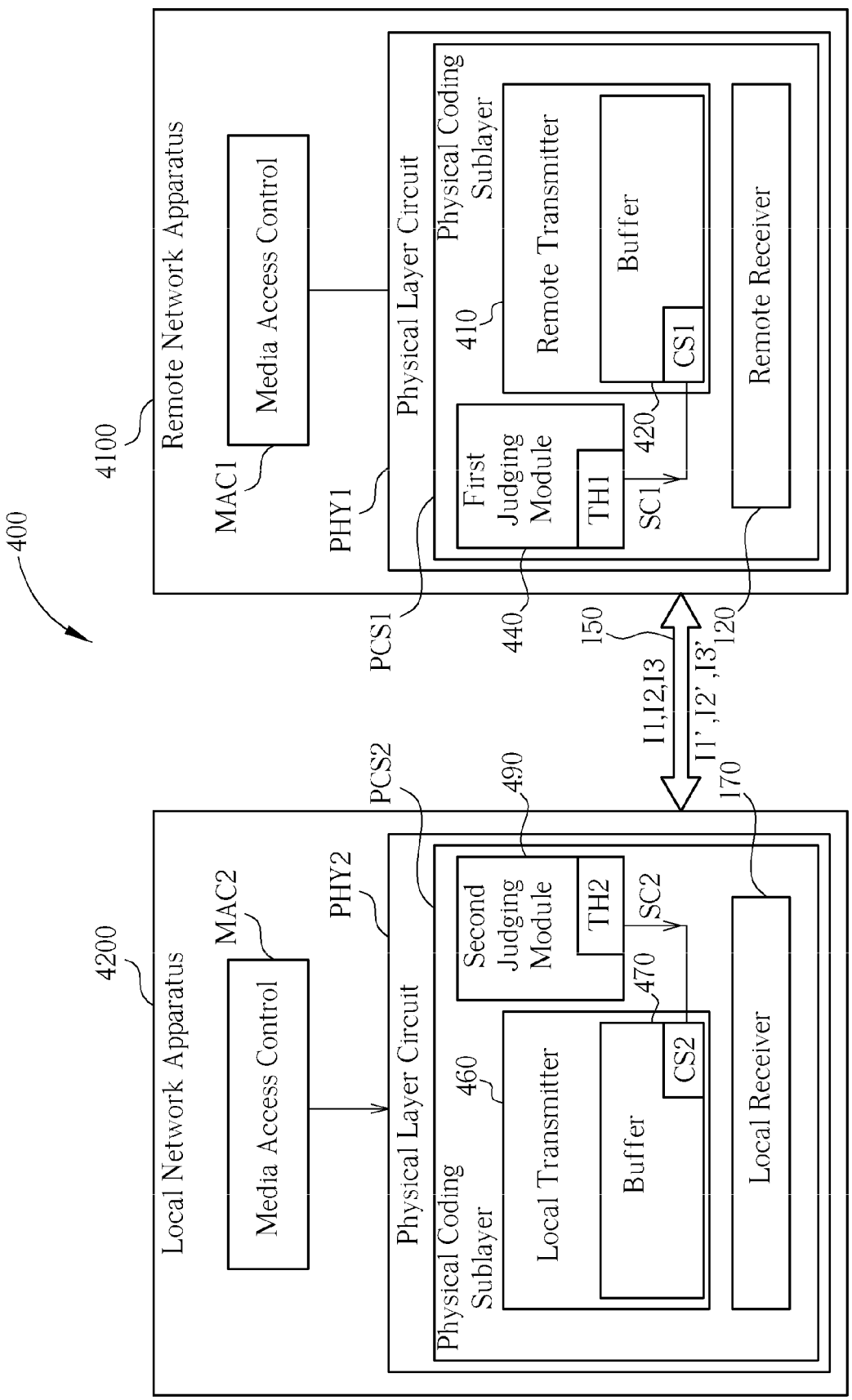
FIG. 4 is a diagram of a network system with power-saving mechanism according to a second embodiment of the present invention.

Please refer to FIG. 4. FIG. 4 is a diagram of a network system 400 with power-saving mechanism according to a second embodiment of the present invention. The architecture of the network system 400 in FIG. 4 is similar to the network system 100 in FIG. 1, and the difference between them is that the remote network apparatus 4100 of the network system 400 further disposes a buffer 420 and a first judging module 440, wherein the buffer 420 is disposed in the remote transmitter 410. In addition, the local network apparatus 4200 of the network system 400 further disposes a buffer 470 and a second judging module 490, wherein the buffer 470 is disposed in the local transmitter 460. If the local network apparatus 4200 is acted as the local network device, the local network apparatus 4200 utilizes the buffer 470 of the local transmitter 460 to store the output packets during a duration of the local transmitter 460 entering the normal state S1 from the low power state S2. The second judging module 490 determines whether an available storage capacity CS2 of the buffer 470 is greater than a threshold value TH2 to generate a designated control signal SC2, and then the local transmitter 460 determines whether to generate the local indication signal I1 to the remote receiver 120 or not according to the designated control signal SC2. For example, when the available storage capacity CS2 of the buffer 470 is smaller than the threshold value TH2, the local transmitter 460 does not generate the local indication signal I1; and when the available storage capacity CS2 of the buffer 470 is greater than the threshold value TH2, the local transmitter 460 generates the local indication signal I1. Similarly, if the remote network apparatus 4100 is acted as the local network device, the operations of the remote transmitter 410, the buffer 420, and the first judging module 440 are identical to that of each element of the local network apparatus 4200. Further description of the operations is therefore omitted here for brevity.

In a word, the network system and power-saving mechanism disclosed in the present invention can enter and leave the low power state in the PHY layer to save power without additional processing in the MAC layer. Be noted that, in the first embodiment, the local network apparatus 1200 of the network system 100 needs to receive the commands from the MAC2. But in the second embodiment, the buffer 470 is added into the local network apparatus 4200 of the network system 400 for storing the output packets during the duration of the local transmitter entering the normal state S1 from the low power state S2. Until the available storage capacity CS2 of the buffer 470 is smaller than the threshold value TH2, the local transmitter will stop generating the local indication signal I1 (i.e., entering the normal state S1) to the remote receiver 120. Therefore, only a single PHY chip can implement such function, which can work with any MAC chip to make product popularization higher.

Figure 5:
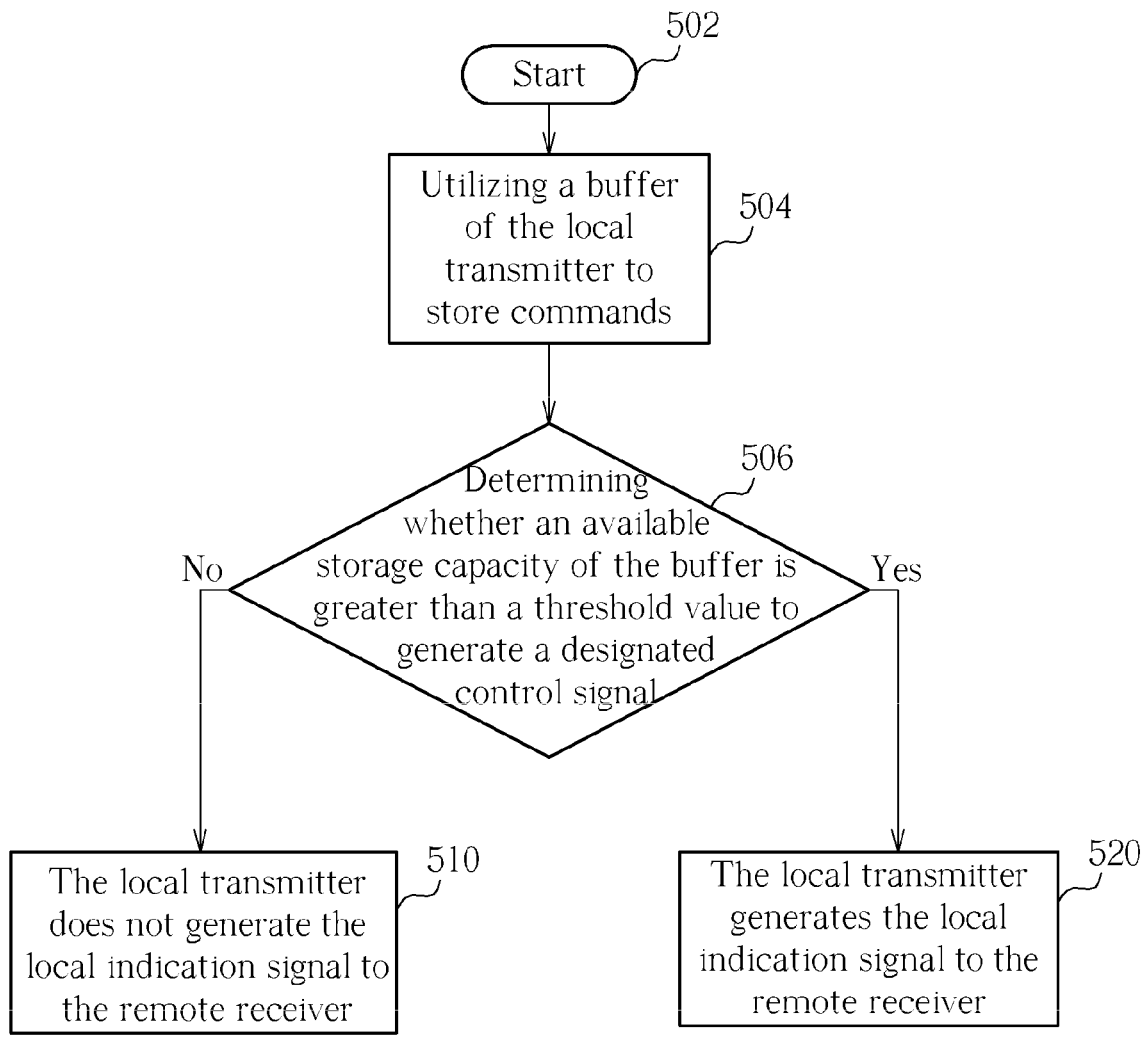
FIG. 5 is a flowchart illustrating a power-saving method applied to a network apparatus according to another exemplary embodiment of the present invention.

Please refer to FIG. 5. FIG. 5 is a flowchart illustrating a power-saving method applied to a network apparatus according to another exemplary embodiment of the present invention. The method includes, but is not limited to, the following steps:

Step 502: Start.

Step 504: Utilizing a buffer of the local transmitter to store commands.

Step 506: Determining whether an available storage capacity of the buffer is greater than a threshold value to generate a designated control signal. When the available storage capacity of the buffer is greater than the threshold value, go to Step 520; otherwise, go to Step 510. In another embodiment of the present invention, when the buffer has data to be transmitted and the available storage capacity is greater than the threshold value, Step 506 can further executes Step 510 after a predetermined time according to a count signal generated by a counter, so as to avoid the data to be transmitted staying for a long time.

Step 510: When the available storage capacity of the buffer is smaller than the threshold value, the local transmitter does not generate the local indication signal to the remote receiver.

Step 520: When the available storage capacity of the buffer is greater than the threshold value, the local transmitter generates the local indication signal to the remote receiver.

How each element operates can be known by collocating the steps shown in FIG. 5 and the elements shown in FIG. 4. Further description of the operations of each step shown in FIG. 5 is therefore omitted here for brevity. Be noted that, the steps 504-520 are executed by the local network apparatus 4200.

The steps of the flowcharts mentioned above are merely practicable embodiments of the present invention, and should not be taken as a limitation of the present invention. These methods can include other intermediate steps or can merge several steps into a single step without departing from the spirit of the present invention.

The abovementioned embodiments are presented merely for describing the present invention, and in no way should be considered to be limitations of the scope of the present invention. In summary, the present invention provides a power-saving method applied to a network system and related device. If the network system is in the link state with no demands for transmitting/receiving packets, the transmitter of the local network device (such as the local transmitter 160) can notify the receiver of the remote link device (such as the remote receiver 120) to enter the low power state S2 through the local indication signal I1 defined by both sides. If the network system is in the link state with demands for transmitting/receiving packets, it can notify the remote receiver to return to the normal state to transmit/receive the packets through the local idle signal I2 to achieve the best power-saving effect. In addition, the power saving mechanism disclosed in the present invention only needs signal processing in the PHY layer and has no need for additional processing in the MAC layer, so as to shorten the whole processing time. Furthermore, a buffer is added into the transmitter of the network apparatus for storing the output packets to be transmitted, and the local transmitter will stop generating the local indication signal (i.e., entering the normal state) until the available storage capacity of the buffer is smaller than the threshold value (such as TH1 and TH2). Therefore, a single PHY chip can implement such function, which can work with any MAC chip to make product popularization higher.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power-saving network apparatus, for maintaining a connection with a remote network apparatus through a physical line in a normal state, an idle state, and a low power state, the power-saving network apparatus comprising:
   a media access controller (MAC), for generating output packets according to output digital signals and processing input packets of the remote network apparatus; and a physical layer circuit (PHY), coupled to the MAC and to the remote network apparatus through the physical line, the PHY comprising:
- a transmitter executing the operations of:
  - when the transmitter enters the normal state, transmitting a local data signal to the remote network apparatus according to the output packets of the MAC;
  - when the transmitter enters the idle state, transmitting a local idle signal to the remote network apparatus;
  - when the transmitter enters the low power state, transmitting a local indication signal to the remote network apparatus to notify the remote network apparatus to enter the low power state, wherein the local indication signal is different from the local idle signal to avoid the remote network apparatus treating the local indication signal as the local idle signal; and
  - entering the idle state or the normal state from the low power state in response to at least one of a first predetermined period and a transmitting enable signal; and
- a receiver executing the operations of:
  - when the receiver lies in the normal state, transmitting the input packets to the MAC of the power-saving network apparatus according to a remote data signal of the remote network apparatus;
  - when the receiver lies in the idle state, receiving a remote idle signal of the remote network apparatus;
  - when the receiver receives a remote indication signal of the remote network apparatus, entering the low power state, wherein the remote indication signal is different from the remote idle signal to avoid the receiver treating the remote indication signal as the remote idle signal; and
  - entering the idle state or the normal state from the low power state in response to at least one of a second predetermined period and a wake-up signal.

2. The apparatus of claim 1, wherein the local idle signal is identical to the remote idle signal.

3. The apparatus of claim 2, wherein the wake-up signal is identical to the local idle signal and the remote idle signal.

4. The apparatus of claim 1, wherein the wake-up signal is generated by the remote network apparatus.

5. The apparatus of claim 1, wherein the local indication signal is identical to the remote indication signal.

6. The apparatus of claim 1, wherein the PHY turns off the power supply to part or all circuits of the transmitter when the transmitter enters the low power state, and the PHY turns on the power supply to the part or all circuits of the transmitter when the transmitter enters the idle state or the normal state.

7. The apparatus of claim 1, wherein the PHY turns off the power supply to part or all circuits of the receiver when the receiver enters the low power state, and the PHY turns on the power supply of the part or all circuits of the receiver when the receiver enters the idle state or the normal state.

8. The apparatus of claim 1, wherein the transmitter enters the low power state from the idle state or the normal state in response to the transmitting enable signal.

9. The apparatus of claim 8, wherein the transmitting enable signal is provided by the MAC.

10. The apparatus of claim 1, wherein the transmitting enable signal is provided by the MAC.

11. The apparatus of claim 1, further comprising:
a buffer, for storing the output packets during a duration of the transmitter entering the normal state from the low power state, wherein the transmitting enable signal is generated according to an available storage capacity of the buffer.

12. The apparatus of claim 1, wherein the power consumption of the power-saving network apparatus in the low power state is smaller than the power consumption of the power-saving network apparatus in the idle state, and the power consumption of the power-saving network apparatus in the idle state is smaller than the power consumption of the power-saving network apparatus in the normal state.

13. The apparatus of claim 1, wherein the PHY detects whether a response signal of the remote network apparatus is received after the transmitter has transmitted the local indication signal, and thereby verify whether the remote network apparatus agrees to enter the low power state.

14. The apparatus of claim 1, wherein the power-saving network apparatus, in response to the remote indication signal, sends out a response signal to the remote network apparatus to notify it that the receiver agrees to enter the low power state.

15. The apparatus of claim 1, wherein the power-saving network directly enters the low power state without waiting for a response signal for the local indication signal from the remote network apparatus.

16. A power-saving network apparatus, for maintaining a connection with a remote network apparatus through a physical line in a normal state, an idle state, and a low power state, the power-saving network apparatus comprising:
- a media access controller (MAC), for generating output packets according to output digital signals and processing input packets of the remote network apparatus; and
- a physical layer circuit (PHY), coupled to the MAC and to the remote network apparatus through the physical line, the PHY comprising a transmitter executing the operations of:
  - when the transmitter enters the normal state, transmitting a data signal to the remote network apparatus according to the output packets of the MAC;
  - when the transmitter enters the idle state, transmitting an idle signal to the remote network apparatus;
  - when the transmitter enters the low power state, transmitting an indication signal to the remote network apparatus to notify the remote network apparatus to enter the low power state, wherein the indication signal is different from the idle signal to avoid the remote network apparatus treating the indication signal as the idle signal; and
  - entering the idle state or the normal state from the low power state in response to at least one of a predetermined period and a transmitting enable signal.

17. The apparatus of claim 16, wherein the PHY turns off the power supply to part or all circuits of the transmitter when the transmitter enters the low power state, and the PHY turns on the power supply of the part or all circuits of the transmitter when the transmitter enters the idle state or the normal state.

18. The apparatus of claim 16, wherein the transmitter enters the low power state from the idle state or the normal state in response to the transmitting enable signal.

19. The apparatus of claim 18, wherein the transmitting enable signal is provided by the MAC.

20. The apparatus of claim 16, wherein the transmitting enable signal is provided by the MAC.

21. The apparatus of claim 16, further comprising:
a buffer, for storing the output packets during a duration of the transmitter entering the normal state from the low power state, wherein the transmitting enable signal is generated according to an available storage capacity of the buffer.

22. The apparatus of claim 16, wherein the power consumption of the transmitter in the low power state is smaller than the power consumption of the power-saving network apparatus in the idle state, and the power consumption of the transmitter in the idle state is smaller than the power consumption of the power-saving network apparatus in the normal state.

23. The apparatus of claim 16, wherein the PHY detects whether a response signal of the remote network apparatus is received after the transmitter has transmitted the indication signal, and thereby verify whether the remote network apparatus agrees to enter the low power state.

24. The apparatus of claim 16, wherein the power-saving network directly enters the low power state without waiting for a response signal for the local indication signal from the remote network apparatus.

25. A power-saving network apparatus, for maintaining a connection with a remote network apparatus through a physical line in a normal state, an idle state, and a low power state, the power-saving network apparatus comprising:
   a media access controller (MAC), for generating output packets according to output digital signals and processing input packets of the remote network apparatus; and
   a physical layer circuit (PHY), coupled to the MAC and to the remote network apparatus through the physical line, the PHY comprising a receiver executing the operations of:
      when the receiver lies in the normal state, transmitting the input packets to the MAC according to a data signal of the remote network apparatus;
      when the receiver lies in the idle state, receiving an idle signal of the remote network apparatus;
      when the receiver receives an indication signal of the remote network apparatus, entering the low power state, wherein the indication signal is different from the idle signal to avoid the receiver treating the indication signal as the idle signal; and
      entering the idle state or the normal state from the low power state in response to at least one of a predetermined period and a wake-up signal.

26. The apparatus of claim 25, wherein the wake-up signal is identical to the idle signal.

27. The apparatus of claim 25, wherein the wake-up signal is generated by the remote network apparatus.

28. The apparatus of claim 25, wherein the PHY turns off the power supply to part or all circuits of the receiver when the receiver enters the low power state, and the PHY turns on the power supply of the part or all circuits of the receiver when the receiver enters the idle state or the normal state.

29. The apparatus of claim 25, wherein the power consumption of the receiver in the low power state is smaller than the power consumption of the power-saving network apparatus in the idle state, and the power consumption of the receiver in the idle state is smaller than the power consumption of the power-saving network apparatus in the normal state.

30. The apparatus of claim 25, wherein the power-saving network apparatus, in response to the remote indication signal, sends out a response signal to the remote network apparatus to notify it that the receiver agrees to enter the low power state.

* * * * *